June 7, 1927.
R. M. WERNER
DETACHABLE SHAFT
Filed Aug. 14, 1924
1,631,236
2 Sheets-Sheet 1
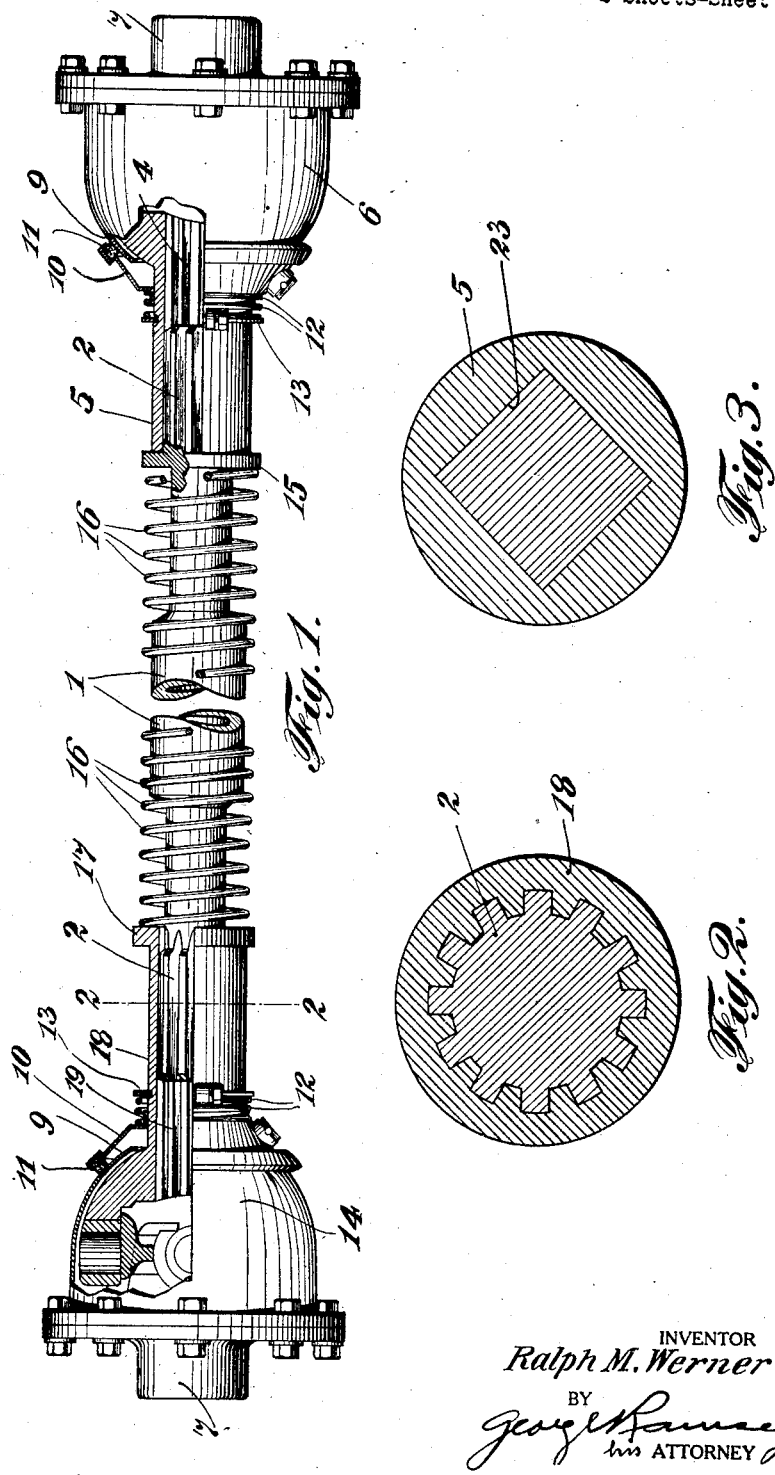
INVENTOR
Ralph M. Werner
BY
George Ramsey
his ATTORNEY June 7, 1927.  R. M. WERNER  1,631,236
DETACHABLE SHAFT
Filed Aug. 14, 1924   2 Sheets-Sheet 2
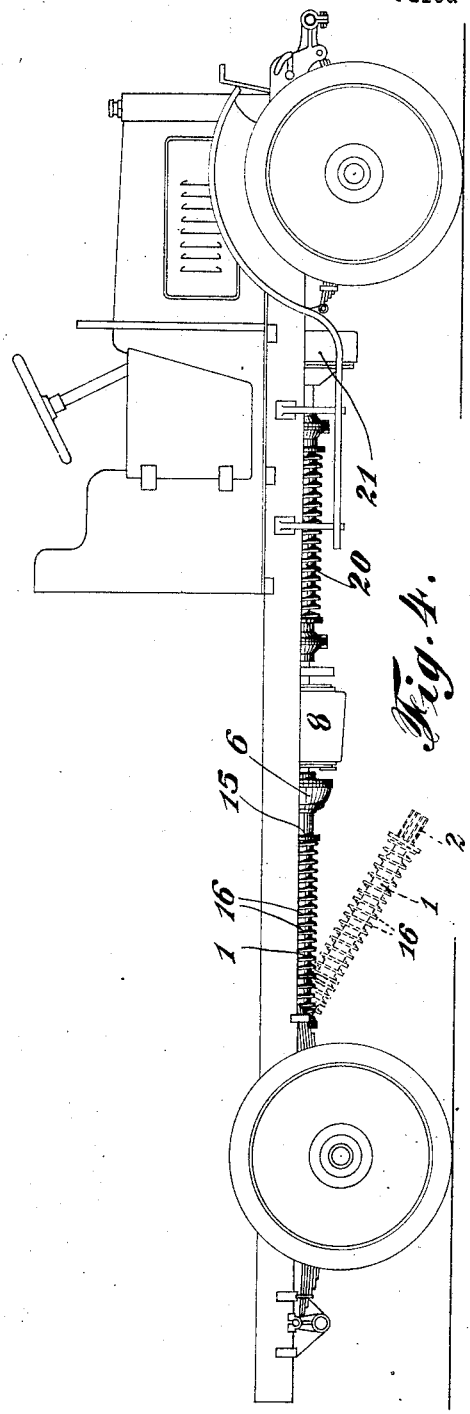
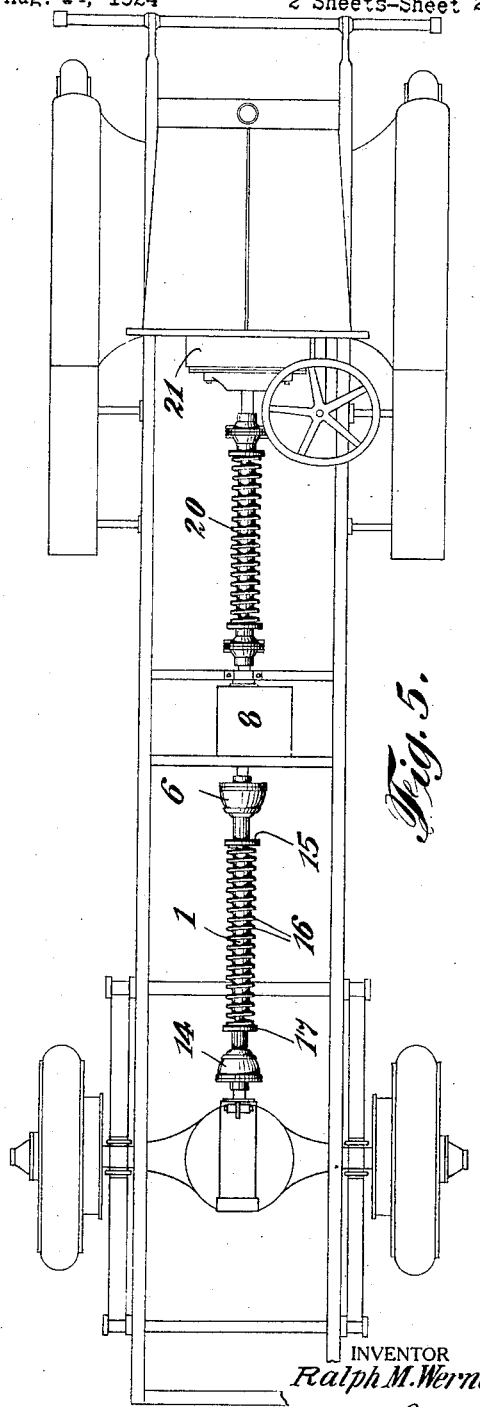
INVENTOR
Ralph M. Werner
BY George Ramsey
ATTORNEY Patented June 7, 1927.

1,631,236

UNITED STATES PATENT OFFICE.

RALPH M. WERNER, OF BROOKLYN, NEW YORK.

DETACHABLE SHAFT.

Application filed August 14, 1924. Serial No. 731,904.

The present invention relates broadly to automotive structures and more especially to a quick detachable shaft.

Heretofore in automotive constructions, particularly in automobile trucks, it has been necessary to demount the driving shafts and a large number of parts in order to make substantial repairs upon the transmission or clutch mechanisms. It was also necessary to demount both the propeller shaft and the transmission shaft when work was to be done on the transmission mechanism. Furthermore, if a universal joint or a driving shaft itself is injured it was necessary to demount a large number of units or parts in order to reach the injured member. In the constructions heretofore used in the art, the propeller shaft and the transmission shaft have been interlocked with the connecting parts so that it was necessary to remove complete units before the propeller shaft could be withdrawn. This operation took several hours of a mechanic's time and also necessitated the use of cranes, or a number of workmen, to handle the heavy parts, thereby further slowing up repairing operations on these units or members.

The present invention overcomes the difficulties of the known art by providing shafts which are slidable into receiving sockets and are held in these sockets by some means, such as for example, spring tension, which is manually operable to release the shafts when desired. This spring may take the form of a coiled spring loosely arranged around the shaft and operating to keep the shaft in place. This construction insures that the parts shall be in positive engagement at all times, but permits the forcible compressing of the spring by moving the shaft endwise sufficiently to allow one end of the shaft to be removed from its receiving socket and then the free end of the shaft may be swung to one side and the opposite end of the shaft may then be withdrawn from its respective socket, without further manipulations. This permits one workman in a few seconds to accomplish that which by prior art constructions required hours of labor, and at the same time the present construction is equally as strong and safe as those undesirable constructions of the prior art.

In view of the foregoing, the principal object of the present invention comprises a power shaft telescopingly mounted at each end into suitable sockets with a suitable retension for holding the shaft in place, while allowing the shaft to be removed without destructive effort, that is, without removing other parts or cutting rivets, or disturbing the relations of other mechanisms.

Another object of the present invention is a shaft construction comprising suitable sockets mounted a predetermined distance apart, with a slidable shaft having end portions adapted to fit said sockets and to be capable of sliding into one socket and of being withdrawn from the other socket, and also to be normally retained in driving engagement with the sockets by means of a surrounding coiled spring which normally urges one end of the shaft into one socket.

Another and important object of the present invention is a propeller shaft for automotive vehicles or the like comprising receiving sockets provided with openings having interlocking members therein and a shaft having on its ends cooperating interlocking members adapted to fit those of the sockets, together with a coil spring normally urging a stop on said shaft against one of said sockets to retain the interlocking portions on the shaft and sockets in engagement but to permit withdrawal of said shaft from said sockets by an endwise movement of the shaft, thus compressing said spring.

Another and important object of the present invention is a quick detachable drive shaft for automobiles, constructed to telescope into reception sockets so that by forcing the shaft endwise to compress the spring one end of the shaft may be withdrawn from its socket, the free end of the shaft swung to one side and then the other end withdrawn from the other socket.

Referring now to the drawings:

Figure 1 illustrates a longitudinal view of a propeller shaft in accordance with the present invention showing portions in cross-section;

Figure 2 is a section through one of the socket members taken on line 2—2, Figure 1;

Figure 3 is a section through a socket member having a different form of interlocking parts;

Figure 4 illustrates a longitudinal view of an assembly of a truck chassis including the present invention;

Figure 5 is a plan view of a truck in accordance with the present invention.

It is to be understood that the present invention may be embodied in constructions other than those herein specifically disclosed and in devices other than herein mentioned therefore the disclosure herewith is to be considered illustrative and not in the limiting sense.

The following is a more detailed description of the invention by reference to Figure 1, that illustrates the preferred form of the invention and in which the propeller shaft 1 is provided on each end with an interlocking portion 2, and the forward end is adapted to fit into a socket 4 in the sleeve member 5 of the universal joint 6. This universal joint is of a well known construction in the art and carries a collar 7 adapted to be attached to a stub shaft carried by the transmission 8 (Fig. 5) or the like. This universal joint is provided with a suitable dust cover 9 and a sliding apron 10 which carries a felt dust ring 11. A small spring 12 bearing against a ring collar 13 tends to maintain the sleeve member extending in line with the axis of the collar 7. A similarly constructed universal joint 14 is to be found at the rear end of the propeller shaft and is so designated on Figures 4 and 5. The parts thereof, however, will not be specifically described in view of their well known character in the art and being similar to the universal joint 6 previously described.

The propeller shaft at its front end is provided with a shoulder 15 which comprises a stop member adapted to bear against the end of the sleeve member 5. This collar also comprises an abutment against which the large coil spring 16 is adapted to bear, and the other end of this large coil spring 16 bears against the end 17 of the sleeve on the universal joint 14. The normal action of the large coil spring is to force the shoulder 15 solidly against the end of the sleeve 5 and thereby prevent the interlocking portion 2 on the propeller shaft 1 from disengaging the sleeve 5. The sleeve 18 of the universal joint 14 is sufficiently long to permit the interlocking member 2 on the propeller shaft to be manually moved endwise in a rearward direction by compressing the large coil spring 16. The amount of movement permitted is sufficient to allow the withdrawal of the interlocking portion 2 from the socket 4 and the swinging of the free end of the propeller shaft downward as indicated in dotted lines in Figure 4 to such a position as to permit the propeller shaft being withdrawn from the rear socket 9. This movement may be quickly accomplished and without the use of tools or without removing any other unit of the assembled construction. A simlar construction may be employed for the transmission shaft 20 which is between the clutch 21 and the transmission 8, or in any other mechanical assembly where removability of individual parts is desired.

Fig. 3 shows the sleeve as being provided with a square socket opening 23, and it will be understood that other shapes and forms of interlocking engagement may be used within the scope of this invention.

Having thus described my invention, what I claim is:

1. An automobile construction comprising socket members adapted to fit the ends of a shaft, a shaft provided on the ends with engaging portions adapted to fit in said socket members, and means for normally maintaining said ends in interlocking engagement with said socket members, said means being capable of being operated to permit the withdrawal of said shaft from said sockets without the removal of either of said sockets.

2. In an automotive construction, a chassis frame, rotating members carried by said chassis frame, sockets on said rotating members, a detachable shaft interlocking with said sockets, and means to permit said detachable shaft to be removed without separating the sockets or removing either of them.

3. In an automotive construction, the combination of a pair of universal joints provided with sleeves, a shaft extending between said universal joints and interlocking at its ends with said sleeves in such manner that the ends of said shaft are slidable in said sleeves, a stop for limiting the sliding movement of said shaft into one sleeve, and means tending normally to resist the sliding movement of said shaft into the other sleeve and to maintain said stop in engagement with the first mentioned sleeve.

4. In an automotive construction, the combination of power line members provided with sleeves, a transmission shaft extending between said sleeves and being slidable endwise in said sleeves, a spring member normally retaining said shaft in position in said sleeves and being yieldable to permit the sliding of said shaft in said sleeves to remove said shaft from said sleeves.

5. As an article of manufacture, a detachable shaft provided on the ends with engaging heads, a suitable stop adjacent one end of said shaft, and a coiled spring bearing against said stop and carried by and surrounding a portion of said shaft and adapted when said shaft is in use to be yieldable to permit the endwise movement of said shaft.

6. An automobile construction comprising a drive shaft having engaging portions on the ends thereof, a pair of permanently mounted sleeves adapted to cooperate with said engaging portions, one of said sleeves being capable of an oscillating movement, means for normally retaining said shaft in engagement with said sleeves, and permitting a manual sliding of said shaft into the sleeve mounted for oscillation and out of the other sleeve to permit said shaft being removed from said sleeves without removing either of the sleeves.

7. In an automotive construction, the combination of a drive shaft having engaging portions on the ends thereof, a pair of permanently mounted sleeves adapted to cooperate with said engaging portions, one of said sleeves being capable of an oscillating movement, means comprising a coiled spring for normally retaining said shaft in engagement with said sleeves, and permitting a manual sliding of said shaft into the sleeve mounted for oscillation and out of the other sleeve to permit said shaft being removed from said sleeves when desired.

8. An automobile construction comprising a pair of universal joints, a sleeve carried by one member of each universal joint, a drive shaft with end portions adapted to interlock with said sleeves whereby power is transmitted from one sleeve to the other through said shaft, and means permitting the removal of said shaft without the removal of said sleeves.

9. In an automotive construction, the combination of a pair of universal joints, a sleeve carried by one member of each universal joint, a drive shaft with end portions adapted to interlock with said sleeves whereby power is transmitted from one sleeve to the other through said shaft, and means comprising a spring member for permitting the removal of said shaft without the removal of said sleeves.

10. An automobile construction comprising, a pair of sleeves, one of which is connected to a driving mechanism and the other of which is connected with a driven mechanism, a shaft extending between said sleeves and adapted to transmit driving forces from the first mentioned sleeve to the second mentioned sleeve, and means whereby said shaft may be moved in the line of its axis to telescope said shaft into one sleeve and out of the other sleeve to permit the free end of said shaft to be swung aside from the sleeve from which it is removed and then to withdraw said shaft from the other sleeve thereby completely removing the shaft.

11. In combination, a driving member, a driven member, a shaft operatively connecting said driving member and said driven member, a stop on said shaft, a coiled spring around said shaft and normally maintaining said stop in engagement with one of said members, said spring being yieldable to permit said shaft to have endwise sliding movements for removal of said shaft without removal of said members.

12. In combination, a driving member, a driven member, a shaft operatively connecting said members and provided with end portions interlocking with said members but capable of endwise slidable movement therein, a coiled spring surrounding a portion of said shaft and normally maintaining the same in driving relation with said members and yieldable to permit endwise movement of said shaft to remove same from said members without removing said members.

RALPH M. WERNER.